United States Patent
Cisneros, Jr. et al.

(10) Patent No.: US 11,834,808 B1
(45) Date of Patent: Dec. 5, 2023

(54) PROGRAMMABLE DREDGE SPOILS SLURRY PROCESS AND DEWATERING SYSTEM

(71) Applicant: DynoTech, LLC, Kemah, TX (US)

(72) Inventors: Alfred Cisneros, Jr., Galveston, TX (US); Gordon R. England, Fort Worth, TX (US); Don Rhule, New Hope, PA (US); Jan Dekker, Victoria, TX (US)

(73) Assignee: DYNO OIL AND ELECTRIC LLC, Kemah, TX (US)

( * ) Notice: Subject to any disclaimer, the term of this patent is extended or adjusted under 35 U.S.C. 154(b) by 121 days.

(21) Appl. No.: 16/915,973

(22) Filed: Jun. 29, 2020

Related U.S. Application Data

(60) Provisional application No. 62/868,862, filed on Jun. 29, 2019.

(51) Int. Cl.
| | |
|---|---|
| *E02F 7/06* | (2006.01) |
| *C02F 1/56* | (2023.01) |
| *C02F 11/121* | (2019.01) |
| *C02F 11/14* | (2019.01) |
| *E02F 3/94* | (2006.01) |
| *E02F 5/28* | (2006.01) |
| *B01D 21/00* | (2006.01) |
| *B01D 21/01* | (2006.01) |
| *C02F 9/00* | (2023.01) |
| *C02F 103/00* | (2006.01) |

(52) U.S. Cl.
CPC ............ *E02F 7/065* (2013.01); *C02F 1/56* (2013.01); *C02F 11/121* (2013.01); *C02F 11/14* (2013.01); *E02F 3/94* (2013.01); *E02F 5/28* (2013.01); *B01D 21/0012* (2013.01); *B01D 21/01* (2013.01); *C02F 9/00* (2013.01); *C02F 2103/007* (2013.01)

(58) Field of Classification Search
None
See application file for complete search history.

(56) References Cited

U.S. PATENT DOCUMENTS

| | | | | |
|---|---|---|---|---|
| 5,795,484 A | * | 8/1998 | Greenwald, Sr. | B01D 33/646 44/622 |
| 5,938,936 A | * | 8/1999 | Hodges | B01D 29/52 210/705 |
| 2016/0074780 A1 | * | 3/2016 | Herman | C02F 11/121 210/418 |

FOREIGN PATENT DOCUMENTS

WO    WO-0171106 A1 * 9/2001 ........... B01D 61/145

* cited by examiner

*Primary Examiner* — Clare M Perrin
(74) *Attorney, Agent, or Firm* — Karen B. Tripp

(57) ABSTRACT

A dewatering system for separating water from solids in dredged slurries in real-time, parallel to the dredging of harbors, stream, and lakes. Water removed from the solids can be returned to the body of water from which it came. After the system removes debris and sand from the slurry, the system removes capillary water the remaining fines and filters out most toxic particles.

18 Claims, 6 Drawing Sheets

TOP VIEW - STAGGERED MATERIAL DROP - SECTION-A (DWG A-2)

SIDE VIEW STAGGERED MATERIAL DROP - SECTION-A (DWG A-2)

PROGRAMMABLE DREDGE SPOILS SLURRY PROCESS AND DEWATERING SYSTEM

CROSS REFERENCE TO RELATED APPLICATION

This application claims priority from U.S. Provisional Patent Application No. 62/868,862, filed Jun. 29, 2019.

STATEMENT REGARDING FEDERALLY SPONSORED RESEARCH OR DEVELOPMENT

This invention is not the result of federally sponsored research.

REFERENCE TO SEQUENCE LISTING, A TABLE, OR A COMPUTER PROGRAM LISTING, OR A COMPACT DISK APPENDIX

None.

BACKGROUND

1. Field of the Invention

The present invention relates generally to dredging silt and sediments disposed under a body of water, and more particularly to apparatuses and methods or systems for removing excess water contained in dredged slurry.

2. Description of Relevant Art

Dredging operations in harbors, rivers and the like are commonly employed to remove silt, sediments and hazardous waste materials that accumulate over time to create hazards in such bodies of water. Typically, the dredged materials are placed on barges, trucks and/or rail cars for shipment to another location for disposal. However, during the dredging operation, it is common for large amounts of water, in addition to solids, to be retained and shipped with the solids, thereby decreasing the efficiency of the dredging operation. Because the cost of sediment removal is based on either volume or weight, a substantial reduction in the amount of retained water can reduce the cost of such operations. For this reason, dewatering systems are used prior to shipment of the dredged solids.

Such dewatering systems of such dredged slurries, however, can themselves be costly and inefficient, and leave considerable dredged sludge still suspended in water in the form of a slurry. Such slurries can create recovery problems upon discharge directly into holding lagoons or settling basins. Accordingly, there continues to be a need to efficiently dewater and reclaim, for beneficial use, the solid material from such slurries, returning clear clean water to its origin.

SUMMARY OF THE INVENTION

The present invention provides a dewatering system for removing retained water from dredged materials in slurries that can be conducted simultaneously with or in parallel to the dredging of said slurries during dredging of commercial or environmental impacted deposits and sediments in harbors, streams, lakes and other bodies of water. Such slurries typically comprise large debris such as rocks, tree limbs, grasses, as well as sands of multiple grain sizes, and various chemical elements and compositions.

The dewatering system of the invention first removes the large debris from the slurries and then de-sands the slurries through screening, separating out the various multiple sized sand grains by size and weight. Next, in the dewatering system of the invention, the specific gravity and density of the fines remaining in the slurries is measured.

The slurries, now just containing fines, are constantly agitated to keep the fines in suspension in the slurries. An appropriate anionic and cationic polymer blend for optimum flocculation of the fines, also called particles, is added to the slurries to cause flocculation of the fines or particles. Water is then stripped from the flocculants using a horizontal specific gravity separator. The flocculants are further dewatered, first through a conveyance chute with a concave screen and vibration, and then through multiphase membrane extraction and a dewatering box. The resulting waters are filtered if required for discharge to remove any toxins and then the solids are ready for recycling.

DETAILED DESCRIPTION OF THE INVENTION

The present invention provides an improved system for dewatering slurries from dredging harbors, streams, lakes, and similar bodies of water. The system includes a number of advantages over known prior art systems and yields higher levels of beneficial reuse, faster dewatering rates, and higher pulp density of slurry and filtrate. The system can be computer automated for continuous operation with minimum manpower. Moreover, the system provides a process that enables total release of capillary water from dredged solids, which prior art systems do not do. That is, the system of the invention removes more water from dredged slurries than prior art systems, and such water is removed in a sufficiently clean state that it can be returned to the body of water from which the slurry came, without further processing.

The system of the invention includes a mechanical subsystem and a computer-controlled subsystem, which affords continuous operation and monitoring with a minimum of manpower.

First, the system separates out larger debris from dredged slurry, that is, materials larger than sand and fines, material such as shells, gravel, and vegetation. The system then separates out sand from the slurry. The sand will have multiple size grains and the system screens such sand in desired groupings, such as coarse, medium and fine sands for reuse.

The specific gravity and density of the remaining fines in the slurry is determined and used to ascertain appropriate polymers for flocculating the fines. Such an appropriate cationic and anionic polymer mix is then added, individually, to the slurry and the fines are flocculated in the slurry. The slurry is then directed into a horizontal specific gravity separator where the clear water is stripped from the slurry. Water/particle flow enhancements may be added to this separator, specific to a particular operation. The water will be sufficiently clean that it can be returned to the body of water from which it came.

Figure 1:
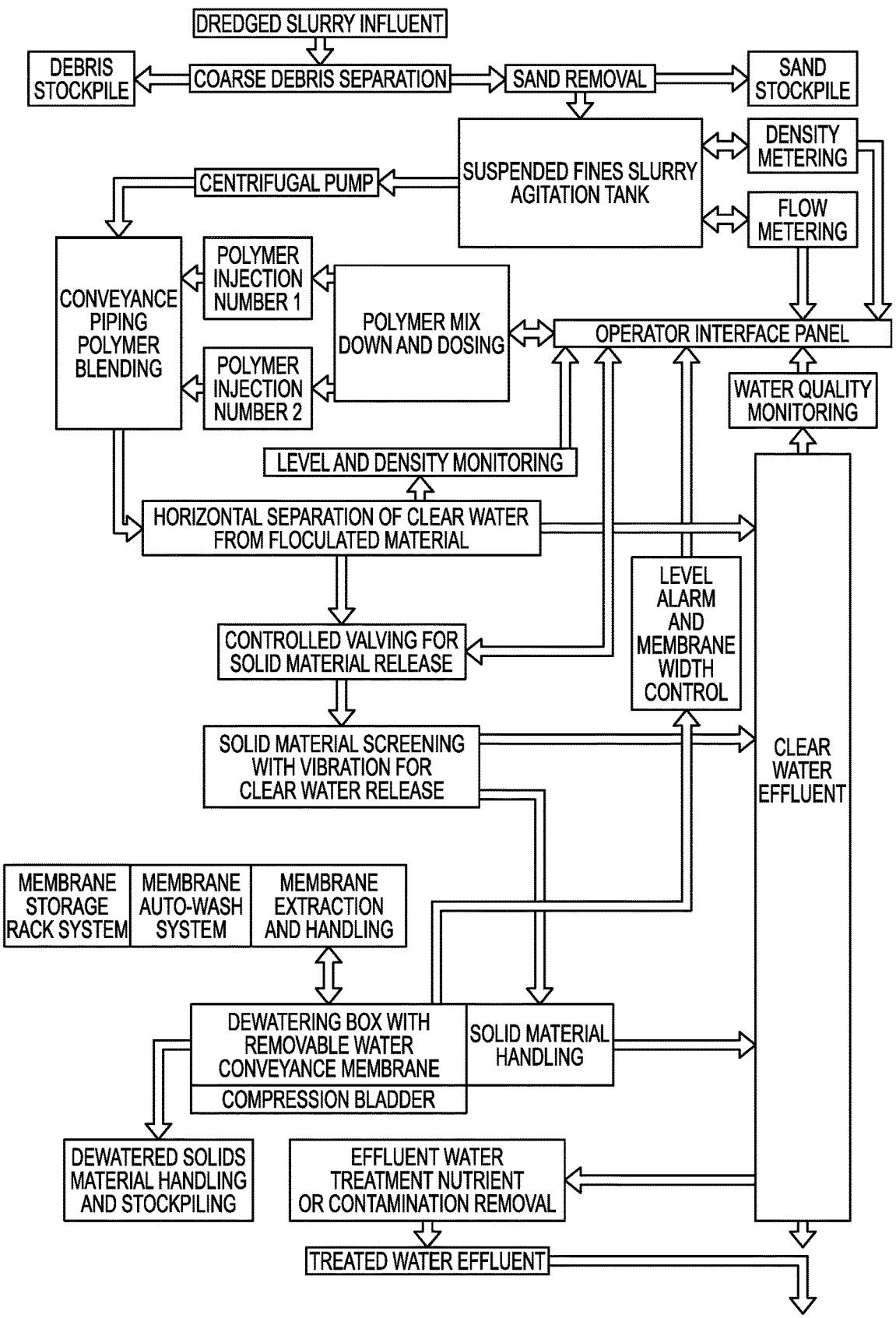
FIG. 1 provides a flow chart of the programmable dredge spoils slurry process and dewatering system of the invention.
Figure 2:
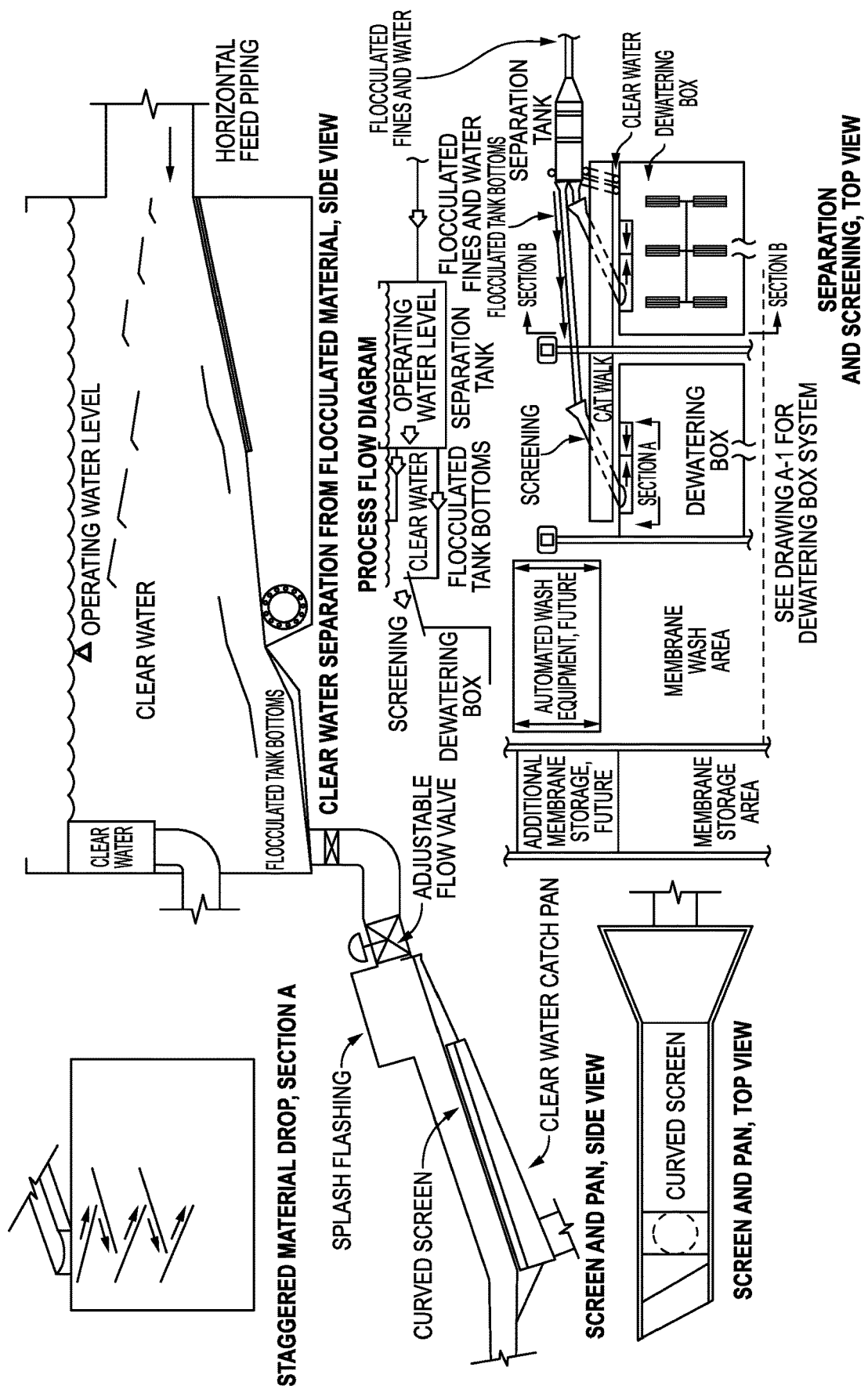
FIG. 2 provides a diagram of the separation and screening stage or steps of the system of the invention following flocculation of the solids.

The fines are then sent through a conveyance chute and onto a concave screen with vibration for further water removal. The concave screen promotes the highest release for underflow water release tension at the upper side slopes of the screen with higher water release flow at the bottom center. The screen width is narrower than previous art, specifically designed to allow ease in protection during cold weather operation. (FIG. 2). In some embodiments, the concave screen may be modified to a half moon screen, a flat screen, or a drum screen, all with vibration, rotating and/or self washing capabilities.

The slurry off of the chute is then conveyed to the dewatering box floor at the level of deposited solids by a staggered material drop, minimizing shear of flocculated materials.

The fines are then placed into a multiphase membrane dewatering box for water extraction. This membrane is flexible and is expanded for the dewatering phase and contracted for the extraction phase, allowing a reduced tension for extraction. Dewatering membranes are expandable through bladders within, utilizing water filled or extracted from the bladder within the membranes for the expansion and contraction. Optionally, non-expanding flexible membranes may be employed with the expandable membranes where needed. The fines are then sent to a dewatering box. The bottom section of the membrane expands wider at the contact interface of the dewatering box floor allowing an expanded contract surface for maximum capillary water release into effluent water conveyance annulus of the dewatering box.

Figure 3:
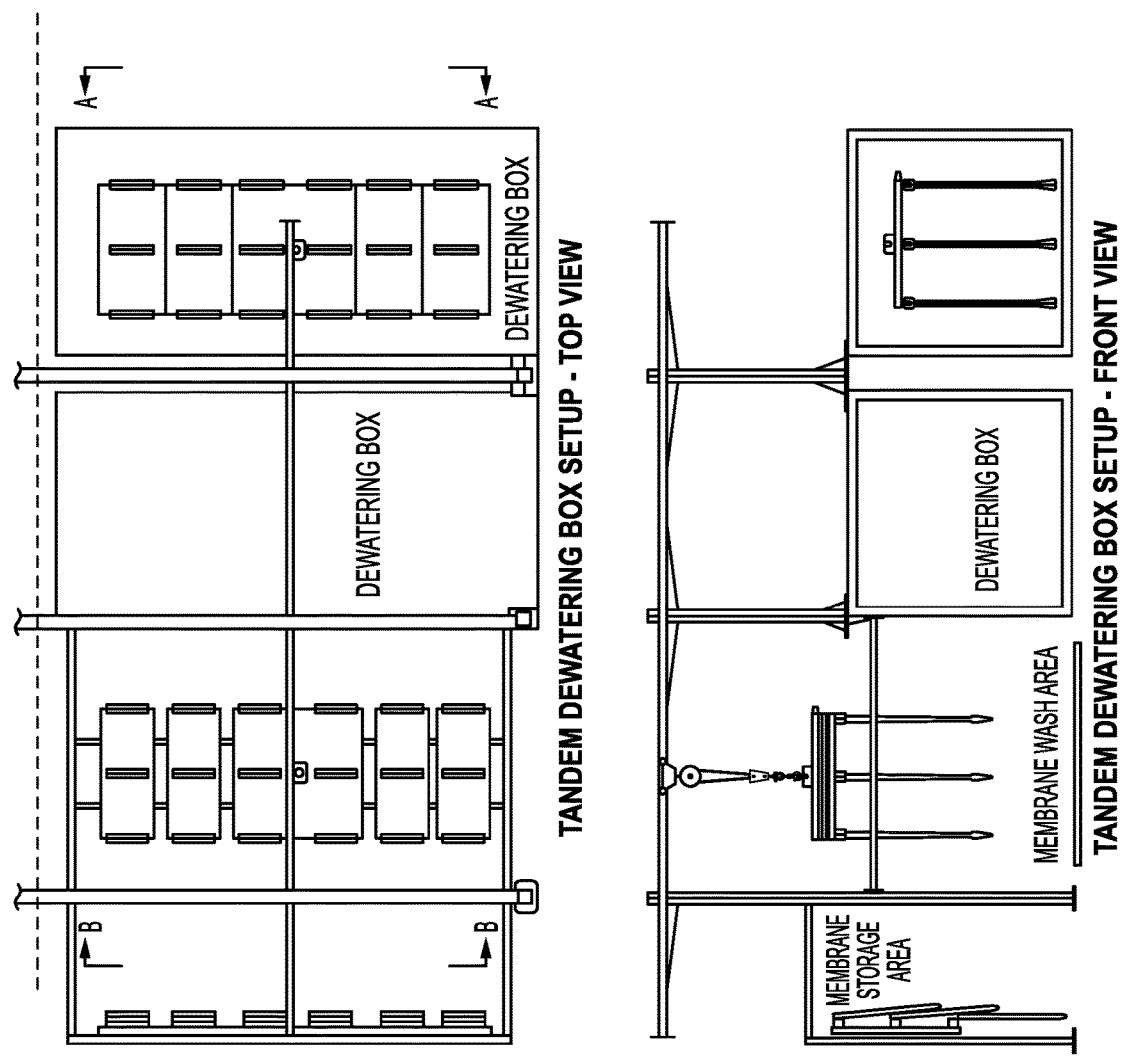
FIG. 3 provides a diagram of the tandem dewatering box system of the invention.
Figure 3:
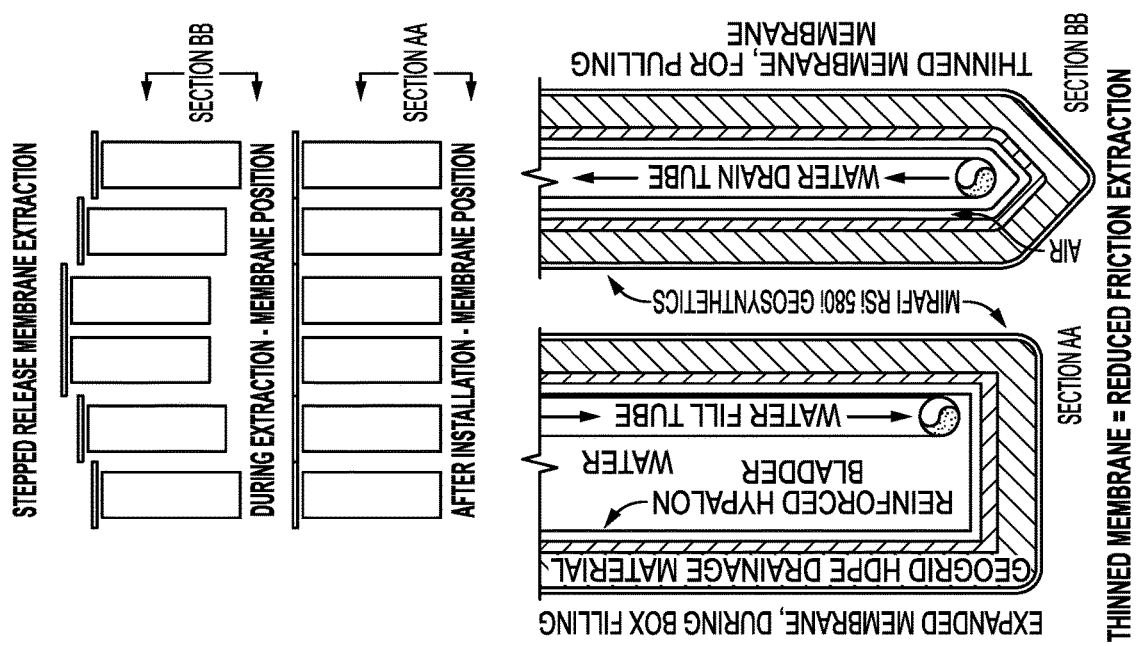
Figure 4:
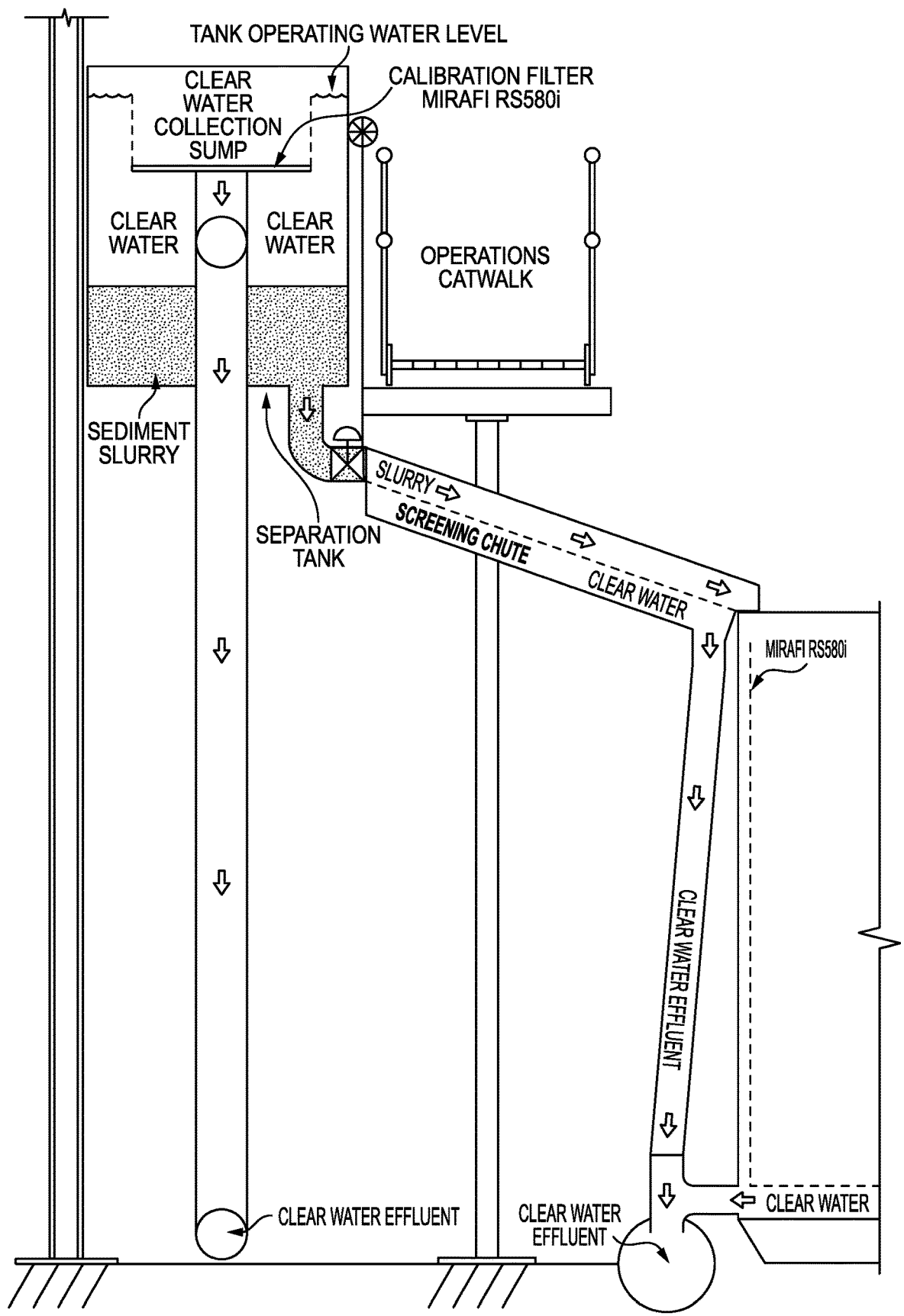
FIG. 4 provides a diagram of a section of the system profile.
Figure 5:
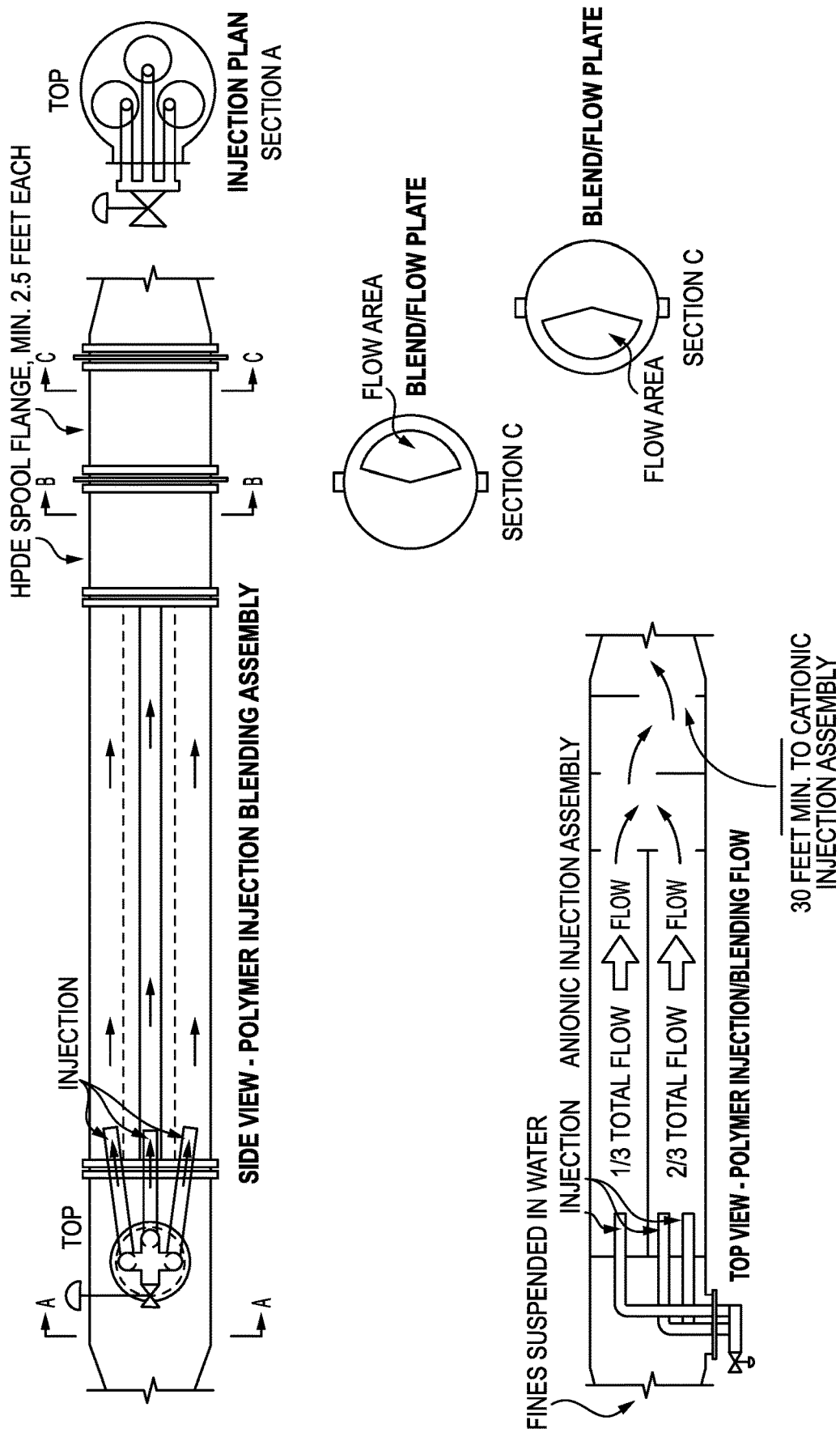
FIG. 5 provides a diagram of the polymer injection blender operations.
Figure 6:
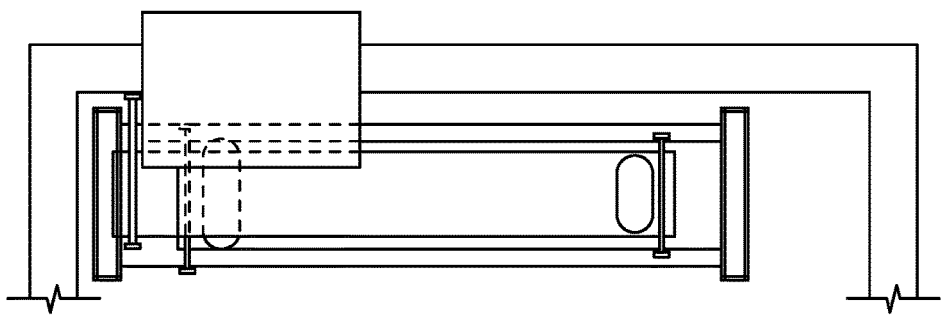
FIG. 6 provides a diagram showing the set up for the dewatering box staggered material drop of the invention.
Figure 6:
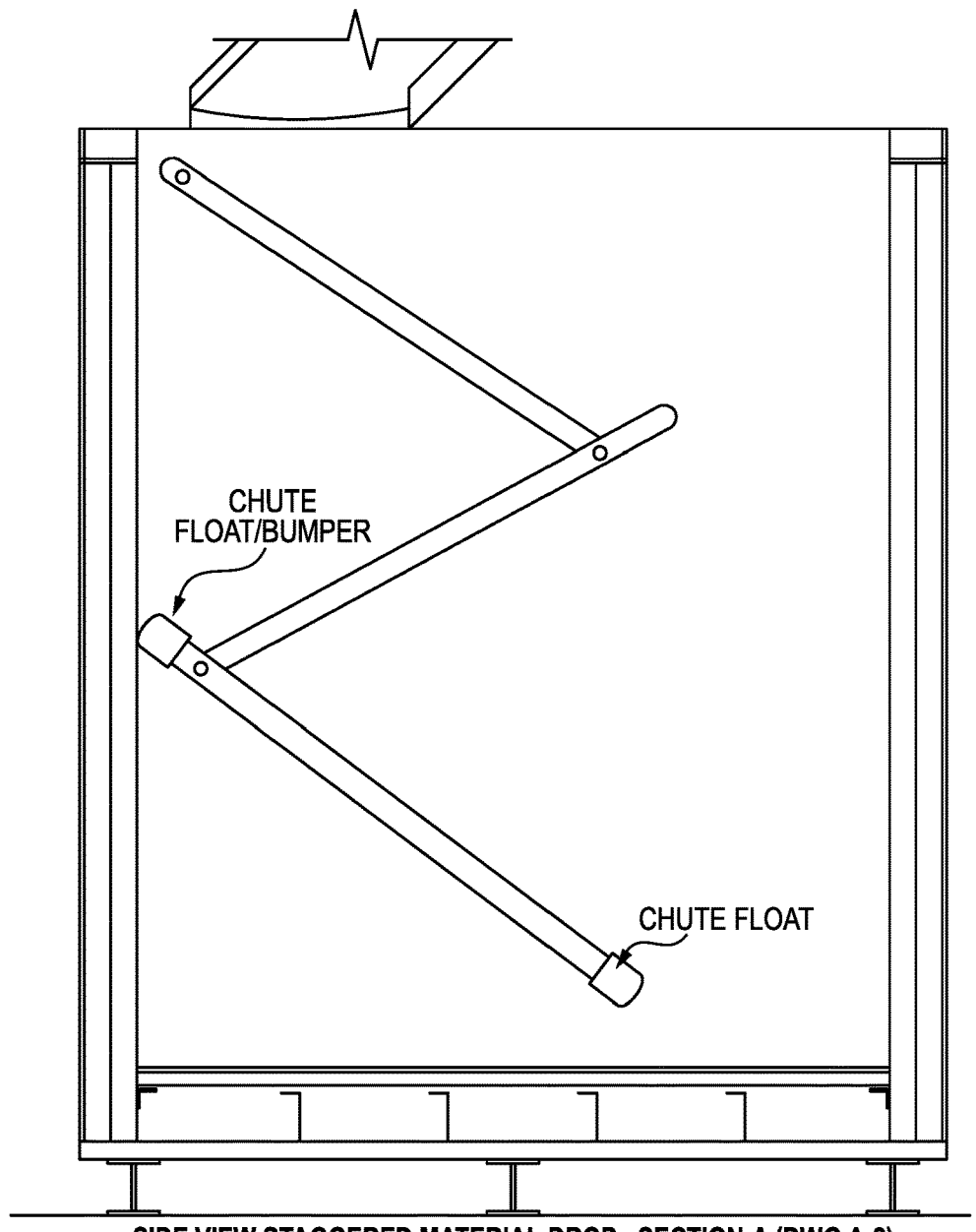

Dewatering membranes are flexible and supported with a rigid upper support frame system. The folding feature allows folding of the membrane material for ease in stackable storage during dewatering box cleaning, reducing the work space. The flexible membranes are suspended length wise within the dewatering box allowing robotic auto washing of the full membrane surface in the membrane wash area. Previous art utilizes rigid membranes with no process to reduce the storage foot print of the membrane assemblies. (FIG. 3). Lastly, the released waters are filtered to remove any toxic particles or elements.

The overhead membrane handling system employs a duel speed extraction hoist for ease of: membrane extraction; handling for membrane washing; and storage handling. Previous art requires membrane extraction utilizing heavy equipment, reducing productivity and requiring a heavy structural working surface.

The computer-controlled subsystem of the system of the invention includes a control unit for continuously monitoring sensed parameters or fluid flows, densities, polymer feed rates, tank levels, and valve positions, and water quality. The computer continuously compares sensed parameters with programmed input data for continuously generating operational adjustment and correction signals to be fed back to the mechanical subsystems. The computer maintains the sensed parameters within limitations set by regulations, automatically, while continuously adjusting and reporting the operation parameters.

While preferred embodiments of the invention have been described, it should be understood that other various changes, adaptations and modifications can be made therein without departing from the spirit of the invention as reflected in the claims.

What is claimed is:

1. A dewatering system for removing retained water from dredged materials in slurries resulting from dredging of harbors, streams, lakes and other bodies of water, said dredged materials including debris, sands of multiple grain sizes and fines, and various chemical elements and compositions, the dewatering system comprising:

(a) receiving influent from said slurries containing dredged materials into an influent receiver of said dewatering system;
   (b) removing debris greater than about ¼ inch from said influent from the slurries with a coarse debris separator of said dewatering system;
   (c) de-sanding said influent from the slurries with a sand remover of said dewatering system, including screening sized for separation of multiple-sized sand grain by size and weight and measuring the specific gravity of the fines remaining in the slurries, and removing the larger, separated-out sand;
   (d) agitating the remaining influent from the slurries with the fines in an agitation tank of the dewatering system for a constant state of suspension of the fines and sending said remaining influent from the slurries with the fines through a centrifugal pump and into conveyance piping for polymer blending;
   (e) determining appropriate anionic and cationic polymer blend for optimum flocculation of the fines using a computer-controlled subsystem in the dewatering system which continuously monitors sensed parameters;
   (f) injecting with injectors in said conveyance piping said polymer blend into the slurries, creating sturdy solid flocculation of said fines;
   (g) directing said slurries, now flocculated, into a horizontal specific gravity separator in the dewatering system configured to strip water, stripping water from the flocculants by weight, and sending said separated-out water through piping for recycling;
   (h) further dewatering the flocculated particles using a dewatering conveyance chute in the dewatering system with a concave screen with vibration, and conveying fines remaining from said dewatering off of said chute to a dewatering box;
   (i) further dewatering in said dewatering box with multiphase membrane extraction using multiple membranes in an assembly within said dewatering box in the dewatering system; and
   (j) passing removed water through a filter to filter out any toxic particles or elements from recyclable particles or elements.

2. The system of claim 1 wherein the multiphase membrane extraction comprises a staged extraction of the membranes for a staggered reduction in tension throughout the extraction.

3. The system of claim 1 wherein dewatering box includes a collapsible aqua duct for handling of flocculated materials and removal of water as the dewatering box fills with solids.

4. The system of claim 1 wherein a compression bladder or liner filled with water on top of the dewatered solids is used after membrane extraction to promote compression or consolidation of the solids and additional release of capillary water.

5. The system of claim 1 wherein the assembly of the membranes is collapsible for stacked and racked consolidated storage of the membranes.

6. A method for removing retained water from dredged materials in slurries from dredging of a harbor, stream, lake or other body of water, said dredged materials including debris, sands of multiple grain sizes and fines, and various chemical elements and compositions, the method comprising:
  (a) receiving at least a portion of said slurries and removing debris greater than about ¼ inch from said at least a portion of said slurries;
  (b) de-sanding said at least a portion of said slurries, including screening for separation of multiple-sized sand grain by size and weight and measuring the specific gravity of the fines remaining in the slurries, and removing the larger, separated-out sand;
  (c) agitating the remaining at least a portion of said slurries with the fines for a constant state of suspension of the fines;
  (d) determining appropriate anionic and cationic polymer blend for optimum flocculation of the fines;
  (e) injecting said polymer blend into said remaining at least a portion of said slurries with the fines, creating sturdy solid flocculation of said fines;
  (f) directing said remaining at least a portion of said slurries with the solid flocculation of said fines, into a horizontal specific gravity separator, stripping water from the flocculants by weight, and recycling said separated-out water or returning clear water effluent to the dredged harbor, stream, lake or other body of water;
  (g) further dewatering the flocculated particles by sending them (1) through a conveyance chute onto a screen with vibration; and then (2) into a multiphase membrane extraction dewatering box comprising an assembly of membranes wherein said assembly of membranes includes flexible dewatering membranes that expand for the dewatering and contract for their extraction, allowing reduced tension for extraction; and
  (h) filtering out any toxic particles or elements from recyclable particles or elements; and
  recycling said separated-out water or returning clear water effluent to the dredged harbor, stream, lake or other body of water.

7. The method of claim 6 wherein the screen receiving flocculated particles sent through said conveyance chute is a concave screen.

8. The method of claim 6 wherein the screen receiving flocculated particles is a half moon screen, a flat screen, or a drum screen.

9. The method of claim 6 wherein said assembly of membranes further includes membranes that are non-expanding flexible membranes.

10. The method of claim 6 wherein the multiphase membrane extraction comprises a staged extraction of the membranes for a staggered reduction in tension throughout the extraction.

11. The method of claim 6 wherein the dewatering box includes a collapsible aqua duct for handling of flocculated materials and removal of water as the dewatering box fills with solids.

12. The method of claim 6 wherein the membranes are removed after extraction, and further comprising after said membrane removal, adding a compression bladder or liner filled with water on top of the dewatered solids for promoting compression or consolidation of the solids and additional release of capillary water.

13. The method of claim 12 further comprising washing the membranes automatically after use.

14. The method of claim 13 wherein the assembly of the membranes is collapsible for stacked and racked consolidated storage of the membranes.

15. The method of claim 14 wherein an overhead membrane handling system with a dual speed extraction hoist is used for handling said membranes for washing and storage.

16. The method of claim 6 wherein a coarse debris separator is used for said removing debris greater than about ¼ inch from said slurry.

17. The method of claim 6 wherein an agitation tank is used for said agitating the remaining slurries with the fines for a constant state of suspension of the fines.

18. The method of claim 6 conducted in parallel to said dredging of said harbor, stream, lake or other body of water.

\* \* \* \* \*